US00RE43239E

(19) United States
(12) Reissued Patent
Ahn

(10) Patent Number: US RE43,239 E
(45) Date of Reissued Patent: Mar. 13, 2012

(54) COLOR INTERPOLATION METHOD OF IMAGE SENSOR

(75) Inventor: Kil-Ho Ahn, Chungcheongbuk-do (KR)

(73) Assignee: Intellectual Ventures II LLC, Wilmington, DE (US)

(21) Appl. No.: 12/944,035

(22) Filed: Nov. 11, 2010

Related U.S. Patent Documents

Reissue of:
(64) Patent No.: 7,450,751
Issued: Nov. 11, 2008
Appl. No.: 11/221,335
Filed: Sep. 6, 2005

(30) Foreign Application Priority Data

Sep. 7, 2004 (KR) ..... 10-2004-0071442

(51) Int. Cl.
*G06K 9/00* (2006.01)

(52) U.S. Cl. ..... 382/163; 382/162; 382/164; 382/194; 382/260; 345/589; 345/593; 345/606; 345/618; 345/690; 345/694

(58) Field of Classification Search ..... None
See application file for complete search history.

(56) References Cited

U.S. PATENT DOCUMENTS

| | | | | |
|---|---|---|---|---|
| 7,019,777 | B2 * | 3/2006 | Sun | 348/263 |
| 2003/0053691 | A1 | 3/2003 | Chamberlain | |
| 2005/0041116 | A1 | 2/2005 | Tsukioka | |

FOREIGN PATENT DOCUMENTS

| | | |
|---|---|---|
| JP | 07203455 | 8/1995 |
| JP | 2000350223 | 12/2000 |
| JP | 2001320720 | 11/2001 |
| JP | 2004248048 | 2/2004 |

* cited by examiner

*Primary Examiner* — Antonio A Caschera
(74) *Attorney, Agent, or Firm* — McAndrews, Held & Malloy Ltd.

(57) ABSTRACT

A color interpolation method of an image sensor including a pixel array which green, red and blue pixels are arrayed in Bayer pattern is provided. The method includes: calculating a first average value of first values filtered by green pixels on even rows and a second average value of a second values filtered by green pixels on odd rows; comparing a value difference between the first average value and the second average value with a standard value; and performing one of a normal interpolation method and a compensation interpolation method with respect to the values filtered by the green pixels according to the comparison.

19 Claims, 3 Drawing Sheets

COLOR INTERPOLATION METHOD OF IMAGE SENSOR

Matter enclosed in heavy brackets [ ] appears in the original patent but forms no part of this reissue specification; matter printed in italics indicates the additions made by reissue.

FIELD OF THE INVENTION

The present invention relates to an image sensor; more particularly, to an interpolation method for compensating a variation between channels of a green value by an analog circuit and a light interference of a complementary metal oxide semiconductor (CMOS) image sensor.

DESCRIPTION OF RELATED ARTS

Image sensors are devices taking images by using a characteristic which semiconductor devices react to light. That is, pixels of the image sensors detect different brightness and wavelength coming out of each individual subject and read the detected brightness and wavelength into an electrical value. It is a function of the image sensors to change the electrical value into a level enabling a signal processing.

Currently, 1M-pixel image sensors are mainly used. From now on, it is expected that mega pixel image sensors having more than 200 million pixels will be commonly used as digital still cameras have been widely used. Accordingly, it is required to secure technology of image sensors having a great number of pixels to preoccupy a next image sensor market.

A pixel size has been gradually decreased to make image sensors highly integrated and reduce a production cost. According to the decrease in the pixel size, a light interference effect by a light source has been gradually increased.

The light interference effect changes an amount of the light entering to each one of pixels, thereby generating a fine lattice shape on images. The lattice shape causes a shape with a uniform pattern during the step of reducing images, which is required to the step of storing images with a high pixel. Thus, the lattice shape brings quality degradation to image sensors.

FIG. 1 is a block diagram briefly illustrating a conventional image sensor.

Referring FIG. 1, the image sensor includes a pixel array unit 10 comprised of unit pixels as many as the number of N×M (Herein, N and M are natural numbers.), an analog/digital converter 11, a pixel line memory unit 12, a image signal processor 13 and a control and external system interface unit 14.

The control and external system interface unit 14 controls a whole operation of the image sensor by using a finite state machine (FSM) and serves a role of an interface with respect to the external system. Furthermore, the control and external system interface unit 14 has a batch resistor and thus, it is possible to arrange a program with respect to items relating to various internal operations. According to information about the program, the control and external system interface unit 14 controls an operation of a whole chip.

The pixel array unit 10 is formed by placing unit pixels horizontally in the number of N and vertically in the number of M, which the unit pixels are formed to maximize a characteristic the pixels react to the light. The pixel array unit 10 is a part detecting information about images entered from the outside, thereby being considered as a critical part of the whole image sensor.

The analog/digital converter 11 plays a role in converting an analog voltage detected from each of the pixels into a digital voltage to be processed in a digital system.

The pixel line memory unit 12 serves a role in storing a digital data converted through the analog/digital converter 11.

The image signal processor 13 performs various functions, i.e., a color interpolation, a color correction, a gamma correction, an auto white balance and an auto exposure, to improve capacity of the image sensor based on an output value stored in the pixel line memory unit 12, according to different functions of the image sensor.

An image quality of the image sensor depends on a characteristic of the pixels themselves included in the pixel array unit 10 and the functions of the image signal processor 13.

An interpolation method, one of the functions performed by the image signal processor 13, is an operation making each one of pixels has only one color intensity. Thus, the interpolation method is an important factor deciding the image quality of the image sensor.

For Bayer pattern of a typical image sensor, each pixel has information about only one color.

That is, a pixel has information obtained by filtering one of colors of green, red and blue, and after passing through the interpolation method, each individual pixel becomes to restore and have information about all of the three colors of green, red and blue. Afterwards, by using the restored information, the pixels can be produced in an image.

The interpolation method uses a memory and performs a color interpolation by using pixel information neighboring to regions subjected to the interpolation method.

In a typical case, since the interpolation method uses a mean filter and a median filter, the interpolation method provides a disadvantage that an image subjected to the restoration is distorted.

More than two green pixels different from each other generate a difference in values of the processed information due to the light interferences different from each other.

In case that more than the two green pixels generate a noise due to the difference between individual channel values, a noise of a pixel unit is formed when an image is produced.

If the interpolation method described above uses the mean filter and the median filter, a noise formation phenomenon is lessened. However, the noise formation phenomenon is not completely removed by using the mean filter and the median filter. It is impossible to remove a uniform pattern of the noise generated during an image reducing step.

FIGS. 2A and 2B are diagrams illustrating a conventional pixel array having a pixel arrangement of 5×5 which a green pixel G is placed on the center. Particularly, FIGS. 2A and 2B are diagrams illustrating that a difference between individual green channels is generated.

Hereinafter, with reference to FIGS. 2A and 2B, a limitation caused by using the conventional image sensor will be explained.

As described above, the image sensor uses a color filter array to represent only one color for one pixel.

Typically, pixels of a complementary metal oxide semiconductor (CMOS) image sensor are placed in Bayer color filter array given below. Herein, G represents a pixel for filtering a green color of the light; R represents a pixel for filtering a red color of the light; and B represents a pixel for filtering a blue color of the light.

G R G R G R . . .

B G B G B G . . .

From a third row, the same constitution will be repeated.

Recently, image sensors have become smaller due to a higher process technique. A photodiode size has been greatly reduced in a process of fabricating a semiconductor device with a size of 0.18 μm compared with a conventional process of fabricating a semiconductor device with a size of 0.35 μm.

However, since a logic unit processing data is more variously added, a height which a pixel is formed is not decreased compared with the conventional image sensor.

Due to the above described problem, a type the pixel is formed like a well type. The well type becomes one of the factors causing the light interference.

The light interference induces a difference in values of the green pixels placed in the Bayer color filter. The difference in the values of the green pixels generates the noise of the unit pixel on the image finally produced.

Hereinafter, the conventional pixel array illustrated in FIGS. 2A and 2B will be described in detail.

Shaded pixels denote green pixels having a high code value and dotted pixels denote green pixels having a low code value.

Since a noise of a pixel unit generated by a difference in values of the green pixels is formed due to a light interference, an aspect of the noise is changed according to different locations of pixels and the noise is formed by the difference between a value of the green pixels in an odd row and a value of the green pixels in an even row.

It is hard to remove the difference between the value of the green pixels in the odd row and the value of the green pixels in the even row by using the mean filter and the median filter mainly used in the conventional interpolation method and furthermore, the use of the mean filter and the median filter may cause image damage.

SUMMARY OF THE INVENTION

It is, therefore, an object of the present invention to provide a color interpolation method of an image sensor capable of preventing an image from being degraded by a variation between channels of green pixel values.

In accordance with one aspect of the present invention, there is provided a color interpolation method of an image sensor including a pixel array which green, red and blue pixels are arrayed in Bayer pattern, including: calculating a first average value of first values filtered by green pixels on even rows and a second average value of a second values filtered by green pixels on odd rows; comparing a value difference between the first average value and the second average value with a standard value; and performing one of a normal interpolation method and a compensation interpolation method with respect to the values filtered by the green pixels according to the comparison.

BRIEF DESCRIPTION OF THE DRAWINGS

The above and other objects and features of the present invention will become better understood with respect to the following description of the specific embodiments given in conjunction with the accompanying drawings, in which.

DETAILED DESCRIPTION OF THE INVENTION

Hereinafter, detailed descriptions of certain embodiments of the present invention will be provided with reference to the accompanying drawings.

Figure 1:
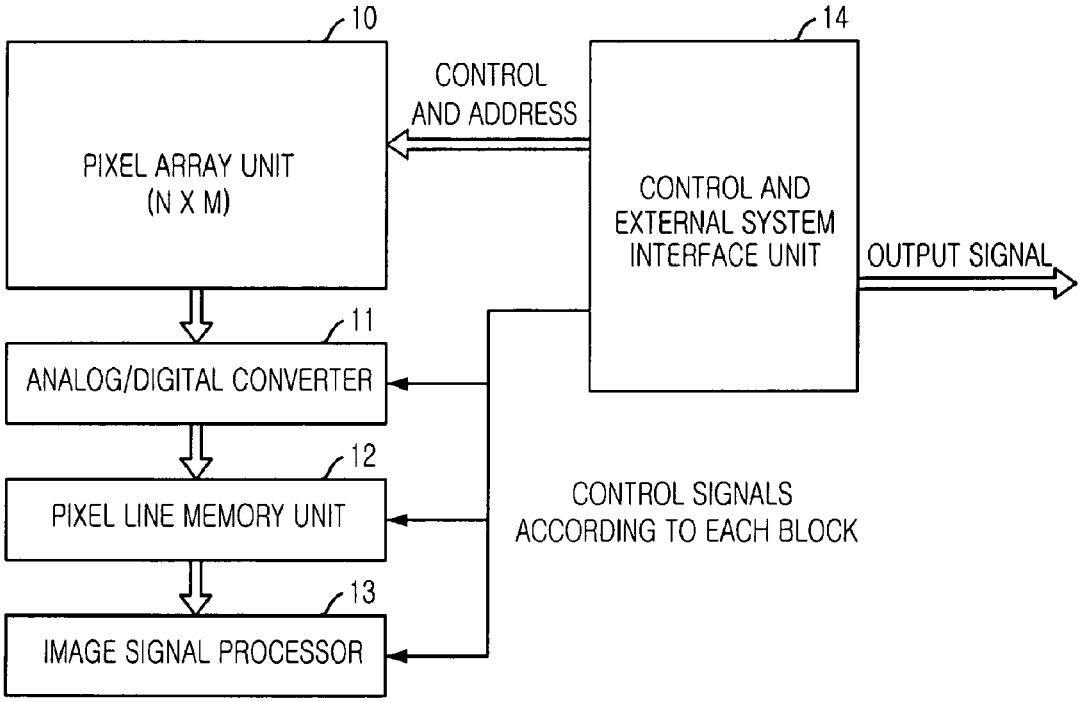
FIG. 1 (PRIOR ART)
FIG. 1 is a block diagram briefly illustrating a conventional image sensor.
Figure 2A:
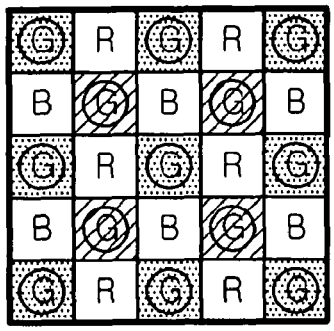
FIG. 2A (PRIOR ART)
FIGS. 2A and 2B are diagrams illustrating a conventional pixel array having a pixel arrangement of 5×5 which a green pixel G is placed on the center.
Figure 2B:
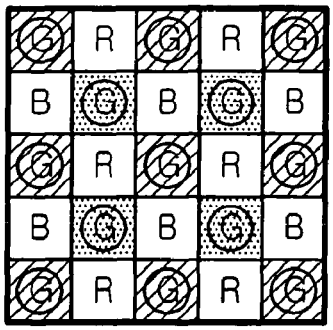
FIG. 2B (PRIOR ART)
Figure 3:
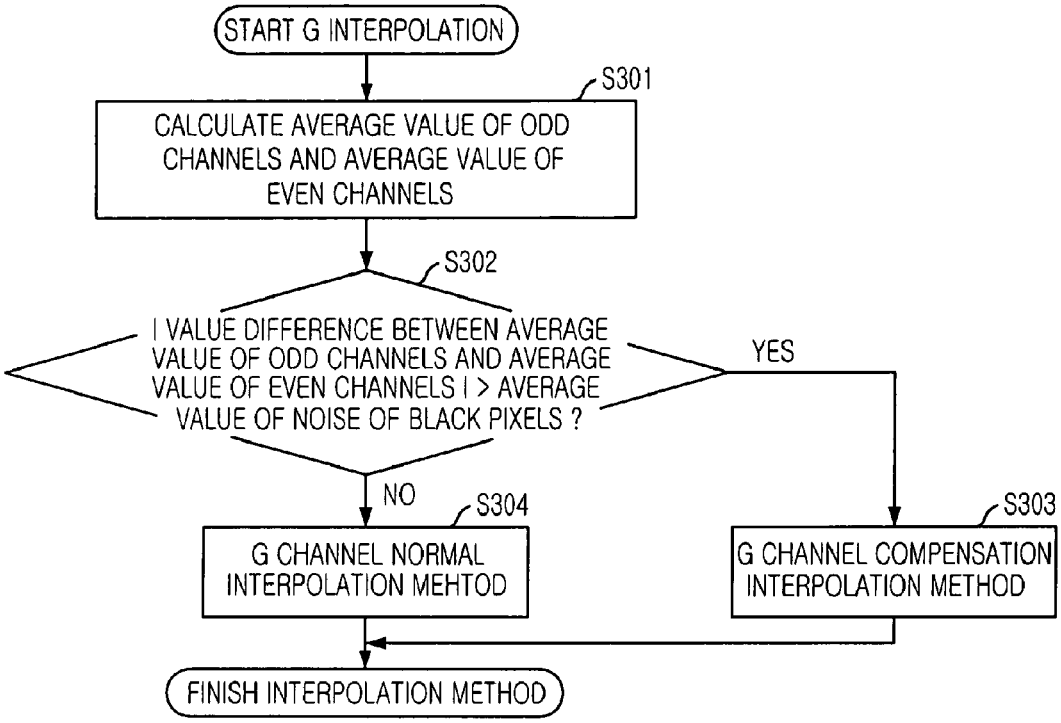
FIG. 3 is a flowchart illustrating interpolation methods subjected to green pixels in accordance with a specific embodiment of the present invention.

FIG. 3 is a flowchart illustrating interpolation methods subjected to green pixels in accordance with a specific embodiment of the present invention. With reference to FIG. 3, an operation in accordance with the specific embodiment of the present invention will be examined.

As for a complementary metal oxide semiconductor (CMOS) image sensor, a plurality of pixels are arrayed in a matrix type.

Among the plurality of pixels arrayed on a pixel array in the matrix type, a plurality of pixels placed along an edge of the pixel array are covered with a metal layer. The pixels covered with the metal layer are called black pixels which cannot receive image information and thus, cannot process image data.

Although the black pixels cannot receive the image information, each of the black pixels outputs a predetermined analog value, i.e., an offset value.

Meanwhile, among the arrayed pixels, normal pixels except the black pixels receive images and then, filter predetermined analog values, thereby outputting the predetermined analog values. At this time, the values filtered and outputted include actual image data and the aforementioned offset values. Herein, the offset value is called a noise.

In accordance with the present invention, a dispersion value of all of the offset values outputted from the pixels placed on the edge of the pixel array is obtained. At this time, the obtained dispersion value is referred as an average value of the noise.

Meanwhile, the pixel array formed in Bayer pattern includes four pixel regions. Among the four pixel regions, green pixels G are placed on the two pixel regions in a diagonal direction. A blue pixel B and a red pixel R are placed on each of the remaining two pixel regions.

At this time, a degree of interference is different depending on the blue pixel B and the red pixel R neighbored to the two green pixels G when the green pixels G filter green components from the incident light.

Accordingly, although the two green pixels G receive the light with the same degree of brightness, the green pixels G obtain different values by filtering the green components according to different locations.

Thus, a filtering property which the green pixel on an odd row has and a filtering property which the green pixel on an even row has are different.

Herein, each of the step of filtering the green components of the light incident to the green pixel on the odd row and the step of filtering the green components of the light incident to the green pixel on the even row is defined as a channel.

For an interpolation method of an image sensor in accordance with the present invention, the average value of the noise is first obtained and then, an average value of the values the green pixels on the odd rows obtain by filtering the green components and an average value of the values the green pixels on the even rows obtain by filtering the green components are calculated respectively. Next, a value difference between the two aforementioned average values, i.e., a value difference between the channels, is obtained. Then, the average value of the noise and the value difference between the channels are compared with each other.

Accordingly, in a case that the average value of the noise is greater than the value difference between the channels, it can be judged that there is no difference between the channels. In a case that the value difference between the channels is greater than the average value of the noise, it can be judged that there is a difference between the channels.

That is, as shown in FIG. 3, an average value of odd channels of odd green pixels and an average value of even channels of even green pixels are calculated respectively and then, a value difference between the average value of the odd channels of the odd green pixels and the average value of the even channels of the even green pixels is calculated at step S301. Furthermore, an average value of a noise of black pixels is calculated and then, the average value of the noise of the black pixels and the value difference between the average value of the odd channels of the odd green pixels and the average value of the even channels of the even green pixels are compared with each other at step S302.

In a case that the value difference between the average value of the odd channels of the odd green pixels and the average value of the even channels of the even green pixels is smaller than the average value of the noise of the black pixels, there is not a difference between the odd channels of the odd green pixels and the even channels of the even pixels. Accordingly, values filtered by green pixels are interpolated through a normal interpolation method at step S304. Meanwhile, in a case that the value difference between the average value of the odd channels of the odd green pixels and the average value of the even channels of the even green pixels is bigger than the average value of the noise of the black pixels, there is a difference between the odd channels of the odd green pixels and the even channels of the even pixels. Accordingly, a compensation interpolation method reducing the difference between the odd channels of the odd green pixels and the even channels of the even green pixels is performed at step S303.

Figure 4A:
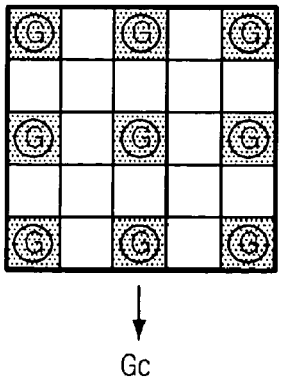
FIGS. 4A and 4B are diagrams illustrating a compensation interpolation method performed when there is a difference between odd channels of odd green pixels and even channels of even green pixels in accordance with the specific embodiment of the present invention.
Figure 4B:
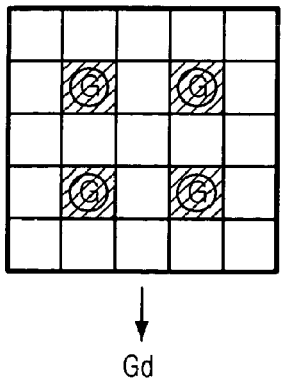

Hereinafter, the compensation interpolation method reducing the difference the odd channels of the odd green pixels and the even channels of the even green pixels will be explained. FIGS. 4A and 4B are diagrams illustrating a compensation interpolation method performed when there is a difference between odd channels of odd green pixels and even channels of even green pixels in accordance with the specific embodiment of the present invention.

As shown in FIG. 4A, a normal interpolation method is performed with respect to a first value Gc filtered by the odd channels of the odd green pixels. Next, as shown in FIG. 4B, a normal interpolation method is performed with respect to a second value Gd filtered by the even channels of the even green pixels. Subsequently, an average value of two values obtained by performing the normal interpolation method twice is calculated. At this time, the obtained average value is used as an interpolation value of the green pixels.

Accordingly, although there is a difference between the first value Gc filtered by the odd channels of the odd green pixels and the second value Gd filtered by the even channels of the even green pixels, since the aforementioned average value of the first value Gc and the second value Gd, it is not possible to observe an error caused by a difference between the odd channels of the odd green pixels and the even channels of the even green pixels as a result of a final interpolation.

In accordance with the present invention, the average value of the values the green pixels on the odd rows obtained by filtering the green components and the average value of the values the green pixels on the even rows obtained by filtering the green components are calculated respectively. Then, according to a correlation between the value difference between the two aforementioned average values and the average value of the noise of the black pixels, different interpolation methods are selected. Accordingly, it is possible to prevent the value obtained by filtering from being changed according to different locations of the green pixels in the pixel array.

The present invention for interpolating defective pixel data exemplifies the case of performing a color interpolation with respect to a pixel placed on the center of an arrangement shown in FIGS. 2A, 2B, 4A and 4B at an image information processor of an image sensor. In addition, the present invention can be also properly transformed and applied with respect to all cases that a data processing method of an image sensor uses an interpolation method using a memory processing data by rows.

As described in the above, in accordance with the present invention, it is possible to prevent an image from degradation caused by a change between channels of green values of an image sensor. Accordingly, the present invention raises an image quality, thereby providing an effect of improving image sensors.

The present application contains subject matter related to the Korean patent application No. KR 2004-0071442 filed in the Korean Patent Office on Sep. 7, 2004, the entire contents of which being incorporated herein by reference.

While the present invention has been described with respect to certain specific embodiments, it will be apparent to those skilled in the art that various changes and modifications may be made without departing from the spirit and scope of the invention as defined in the following claims.

What is claimed is:

1. A color interpolation method of an image sensor including a pixel array which green, red and blue pixels are arrayed in Bayer pattern, the color interpolation method comprising:

calculating a first average value of first values filtered by green pixels on even rows and a second average value of a second values filtered by green pixels on odd rows;

calculating an average value of a noise of black pixels which do not receive image information;

comparing a value difference between the first average value and the second average value with the average value of the noise of the black pixels; and performing selectively, *with an image signal processor,* one of a normal interpolation method and a compensation interpolation method with respect to the values filtered by the green pixels based on a result of the comparison.

2. The color interpolation method of claim 1, wherein [at] the selective performing of one of the normal interpolation method and the compensation interpolation method with respect to the values filtered by the green pixels based on the result of the comparison, if the value difference between the first average value and the second average value is greater [that] *than* the average value of the noise of the black pixels, the compensation interpolation method is employed.

3. The color interpolation method of claim 2, wherein the compensation interpolation method includes:

performing a compensation interpolation operation with respect to the first values;

performing a compensation interpolation operation with respect to the second values; and calculating an average value of values resulted from performing the compensation operations with respect to the first values and the second values, wherein the average value is applied as an interpolation value of the green pixels.

4. The color interpolation method of claim 1, wherein at the selective performing of one of the normal interpolation method and the compensation interpolation method with respect to the values filtered by the green pixels based on the result of the comparison, if the value difference between the first average value and the second average value is smaller than the average value of the noise of the black pixels, the normal interpolation method is employed.

5. The color interpolation method of claim 1, wherein the normal interpolation method uses one of a mean value and an average filter.

*6. A method, comprising:*

*calculating a first average value of first values from green pixels on even rows of a pixel array and a second average value of second values from green pixels on odd rows of the pixel array;*

*calculating an average value of a noise of black pixels, which do not receive image information;*

*comparing a value difference between the first average value and the second average value with the average value of the noise of the black pixels; and*

*performing selectively, with an imaging device, a compensation interpolation method with respect to the first and second values from the green pixels based on a result of the comparison.*

*7. The method of claim 6, wherein said performing selectively a compensation interpolation method comprises performing the compensation method if the value difference between the first average value and the second average value is greater than the average value of the noise of black pixels.*

*8. The method of claim 6, wherein said performing the compensation interpolation method comprises:*

*performing a compensation interpolation operation with respect to the first values;*

*performing a compensation interpolation operation with respect to the second values;*

*averaging values resulting from said performing a compensation interpolation operation with respect to the first values and said performing a compensation interpolation operation with respect to the second values to obtain another average value; and*

*applying the another average value as an interpolation value of the green pixels.*

*9. The method of claim 6, further comprising performing a normal interpretation method with respect to the values from the green pixels if the value difference between the first average value and the second average value is smaller than the average value of the noise of the black pixels.*

*10. The method of claim 9, wherein the normal interpolation method uses a mean value.*

*11. The method of claim 9, wherein the normal interpolation method uses an average filter.*

*12. An image sensor, comprising:*

*a pixel array comprising a plurality of pixels configured to receive image information and a plurality of black pixels configured to not receive image information; and*

*circuitry configured to:*

*calculate a first average value of first values from green pixels on even rows of the pixel array and a second average value of second values from green pixels on odd rows of the pixel array;*

*calculate an average value of a noise of the plurality of black pixels;*

*compare a value difference between the first average value and the second average value with the average value of the noise of the black pixels; and*

*perform selectively a compensation interpolation method with respect to the first and second values from the green pixels based on a result of the comparison.*

*13. The image sensor of claim 12, wherein the circuitry is further configured to perform the compensation interpolation method if the value difference between the first average value and the second average value is greater than the average value of the noise of black pixels.*

*14. The image sensor of claim 12, wherein, in response to performing the compensation interpolation method, the circuitry is further configured to:*

*perform a compensation interpolation operation with respect to the first values;*

*perform a compensation interpolation operation with respect to the second values;*

*average values resulting from the compensation interpolation operation with respect to the first values and said the compensation interpolation operation with respect to the second values to obtain another average value; and*

*apply the another average value as an interpolation value of the green pixels.*

*15. The image sensor of claim 12, wherein the circuitry is further configured to perform a normal interpretation method with respect to the values from the green pixels if the value difference between the first average value and the second average value is smaller than the average value of the noise of the black pixels.*

*16. The image sensor of claim 15, wherein the circuitry is further configured to use a mean value when performing the normal interpolation method.*

*17. The image sensor of claim 15, wherein the circuitry is further configured to use an average filter when performing the normal interpolation method.*

*18. The image sensor of claim 12, wherein the plurality of pixels are formed in a Bayer pattern comprising red pixels, green pixels, and blue pixels.*

*19. The image sensor of claim 12, further comprising a metal layer configured to prevent the black pixels from receiving image information.*

* * * * *

UNITED STATES PATENT AND TRADEMARK OFFICE

CERTIFICATE OF CORRECTION

PATENT NO. : RE43,239 E
APPLICATION NO. : 12/944035
DATED : March 13, 2012
INVENTOR(S) : Ahn It is certified that error appears in the above-identified patent and that said Letters Patent is hereby corrected as shown below:

Title Page, Item (56), under "FOREIGN PATENT DOCUMENT", in Column 2, Line 4, delete "2/2004" and insert -- 9/2004 --, therefor.

Signed and Sealed this
Twenty-fifth Day of September, 2012

David J. Kappos

David J. Kappos
*Director of the United States Patent and Trademark Office*